United States Patent
Bennet et al.

(10) Patent No.: US 8,443,602 B2
(45) Date of Patent: May 21, 2013

(54) CLOSELY-COUPLED EXHAUST AFTERTREATMENT DEVICE FOR A TURBOCHARGED INTERNAL COMBUSTION ENGINE

(75) Inventors: David Bennet, Brighton (GB); Brian G. Cooper, Hove (GB); Huntly W. Thomas, Hove (GB); Nick Winder, Brighton (GB)

(73) Assignees: GM Global Technology Operations LLC, Detroit, MI (US); Ricardo, Inc., Van Buren Township, MI (US)

( * ) Notice: Subject to any disclaimer, the term of this patent is extended or adjusted under 35 U.S.C. 154(b) by 404 days.

(21) Appl. No.: 12/750,277

(22) Filed: Mar. 30, 2010

(65) Prior Publication Data

US 2011/0239644 A1 Oct. 6, 2011

(51) Int. Cl.
*F02B 33/44* (2006.01)

(52) U.S. Cl.
USPC ............... 60/605.2; 60/602; 60/616; 60/280; 60/282

(58) Field of Classification Search
USPC .................. 60/602, 605.2, 616, 280, 282
See application file for complete search history.

(56) References Cited

U.S. PATENT DOCUMENTS

| | | | |
|---|---|---|---|
| 4,122,673 A | 10/1978 | Leins | |
| 5,220,789 A | 6/1993 | Riley et al. | |
| 5,709,081 A | 1/1998 | Bruestle | |
| 5,987,882 A * | 11/1999 | Voss et al. | 60/274 |
| 6,354,078 B1 * | 3/2002 | Karlsson et al. | 60/274 |
| 6,713,025 B1 | 3/2004 | Ivanescu et al. | |
| 7,380,401 B2 * | 6/2008 | Henn et al. | 60/612 |
| 7,748,213 B2 * | 7/2010 | I et al. | 60/287 |
| 7,861,580 B2 * | 1/2011 | Sujan et al. | 73/114.77 |
| 2009/0314082 A1 | 12/2009 | Sujan et al. | |

OTHER PUBLICATIONS

Chinese Office Action issued by the State Intellectual Property Office of the People's Republic of China, dated Jan. 21, 2013.

* cited by examiner

*Primary Examiner* — Ching Chang
(74) *Attorney, Agent, or Firm* — Cantor Colburn LLP

(57) ABSTRACT

An exhaust aftertreatment system for an internal combustion engine includes an exhaust manifold that is configured for fluid communication with an exhaust port to receive an exhaust gas flow. It also includes a primary turbocharger having a turbine inlet configured for fluid communication with the exhaust manifold to receive the exhaust gas flow and pass it to an outlet. It also includes an exhaust bypass valve that is operable for movement between an open position and a closed position, the exhaust bypass valve having an inlet that is configured for fluid communication with the exhaust manifold in the open position to receive the exhaust gas flow and pass it to an outlet. Still further, it includes an exhaust aftertreatment device configured for thermal communication with the exhaust manifold, the device having an inlet configured for fluid communication with the turbine and bypass outlets to receive the exhaust gas flows therefrom.

20 Claims, 5 Drawing Sheets

CLOSELY-COUPLED EXHAUST AFTERTREATMENT DEVICE FOR A TURBOCHARGED INTERNAL COMBUSTION ENGINE

FIELD OF THE INVENTION

Exemplary embodiments of the present invention are related to an exhaust aftertreatment system for an internal combustion engine and turbocharger and, more specifically, to an exhaust aftertreatment system that includes an exhaust aftertreatment device that is closely coupled to the engine and turbocharger.

BACKGROUND

The use of a turbocharger or twin turbochargers has become more prevalent as manufacturers seek to improve the output performance of various internal combustion engine configurations. The turbocharger is frequently given preference in the exhaust aftertreatment system over various exhaust aftertreatment devices. By preference, it is meant that the turbocharger is located upstream of the various exhaust aftertreatment devices, such as the oxidation catalyst, in order to maximize the energy input to, and output available from, the turbocharger. In this arrangement, catalyst light-off is delayed by the thermal load associated with the turbocharger and by locating the exhaust aftertreatment devices, particularly the oxidation catalyst, farther from the exhaust ports. Thus, on engine start-up, it takes longer for the exhaust aftertreatment devices to reach their operating temperatures and perform their emission treatment functions. This delay may be even further exacerbated in twin turbocharger configurations, particularly sequential twin turbocharger configurations where it is desirable to closely couple both turbochargers to maximize their energy output. Such configurations can require that the exhaust aftertreatment devices be placed even further downstream, which further delays catalyst light-off due to the increased distance of these devices from the exhaust ports. This characteristic of turbocharged internal combustion engines, particularly sequential twin turbocharger engine configurations, runs contrary to the general desire in current exhaust aftertreatment systems to light-off the catalyst as quickly as possible, or within a predetermined time period, in order to ensure compliance with tailpipe emissions requirements, particularly at engine start-up.

Accordingly, it is desirable to provide turbocharged internal combustion engine configurations that also provide exhaust aftertreatment systems that provide for rapid catalyst light-off.

SUMMARY OF THE INVENTION

In one exemplary embodiment of the present invention, an exhaust aftertreatment system for an internal combustion engine is provided. The exhaust aftertreatment system includes an exhaust manifold that is configured for fluid communication with an exhaust port, or a plurality of exhaust ports, of an internal combustion engine to receive an exhaust gas flow therefrom. It also includes a primary turbocharger that includes a primary turbine having a primary turbine exhaust inlet that is configured for fluid communication with the exhaust manifold of the engine to receive a primary turbine exhaust gas flow therefrom and to pass this flow to a primary turbine exhaust outlet. It also includes an exhaust bypass valve that is operable for movement between an open position and a closed position, the exhaust bypass valve having an exhaust bypass valve inlet that is configured for fluid communication with the exhaust manifold in the open position to receive a bypass exhaust gas flow therefrom and pass this flow to an exhaust bypass valve outlet. Still further, it includes an exhaust aftertreatment device configured for thermal communication with the exhaust manifold, the device having a device inlet configured for fluid communication with the primary turbine exhaust outlet to receive the primary turbine exhaust gas flow therefrom the bypass outlet to receive the bypass exhaust gas flow therefrom when the bypass valve is in the open position and a device outlet.

In another exemplary embodiment of the present invention, an internal combustion engine that includes an exhaust aftertreatment system is provided. It includes an internal combustion engine having at least one exhaust port, and including a plurality of exhaust ports, and at least one intake port, and including a plurality of intake ports. It also includes an exhaust manifold that is configured for fluid communication with the exhaust port(s) to receive an exhaust gas flow therefrom. It further includes a primary turbocharger comprising a primary turbine having a primary turbine exhaust inlet that is configured for fluid communication with the exhaust manifold of the engine to receive a primary turbine exhaust gas flow therefrom and to pass this flow to the primary turbine exhaust outlet. It also further includes an exhaust bypass valve that is operable for movement between an open position and a closed position, the exhaust bypass valve having an exhaust bypass valve inlet that is configured for fluid communication with the exhaust manifold in the open position to receive a bypass exhaust gas flow therefrom and pass this flow to an exhaust bypass valve outlet. Further, it includes an exhaust aftertreatment device configured for thermal communication with the exhaust manifold, the device having a device inlet configured for fluid communication with the primary turbine exhaust outlet to receive the primary exhaust gas flow therefrom and the bypass outlet to receive the bypass exhaust gas flow therefrom when the bypass valve is in the open position and a device outlet.

The above features and advantages and other features and advantages of the present invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

The present invention includes a closely-coupled exhaust aftertreatment device for use in an exhaust aftertreatment system for an internal combustion engine that includes at least one turbocharger as part of a forced-induction intake air system. The closely-coupled exhaust aftertreatment device of the invention may also be used in the exhaust aftertreatment system for internal combustion engines having a forced-induction intake air system that includes more than one turbocharger, including sequential twin-turbocharger forced-induction intake air systems.

As used herein, "fluid communication" means the passage of a fluid flow from one device or location to another device or location. For example, fluid communication of an exhaust gas flow means communication of the exhaust gas flow from one exhaust treatment device to another. Similarly, fluid communication of an intake airflow means communication of the flow from one intake air system device to another. Generally, fluid communication is done within a sealed system, although it also encompasses communication of fluids where the system is not sealed, or communication of the fluid to an external environment. When used in conjunction with various devices or between devices, such as, for example, exhaust aftertreatment devices or forced-induction system devices, fluid communication may encompass the use of various conduits, pipes, mounting flanges, seals, gaskets and other structures and features for accomplishing communication of the fluid.

Figure 1:
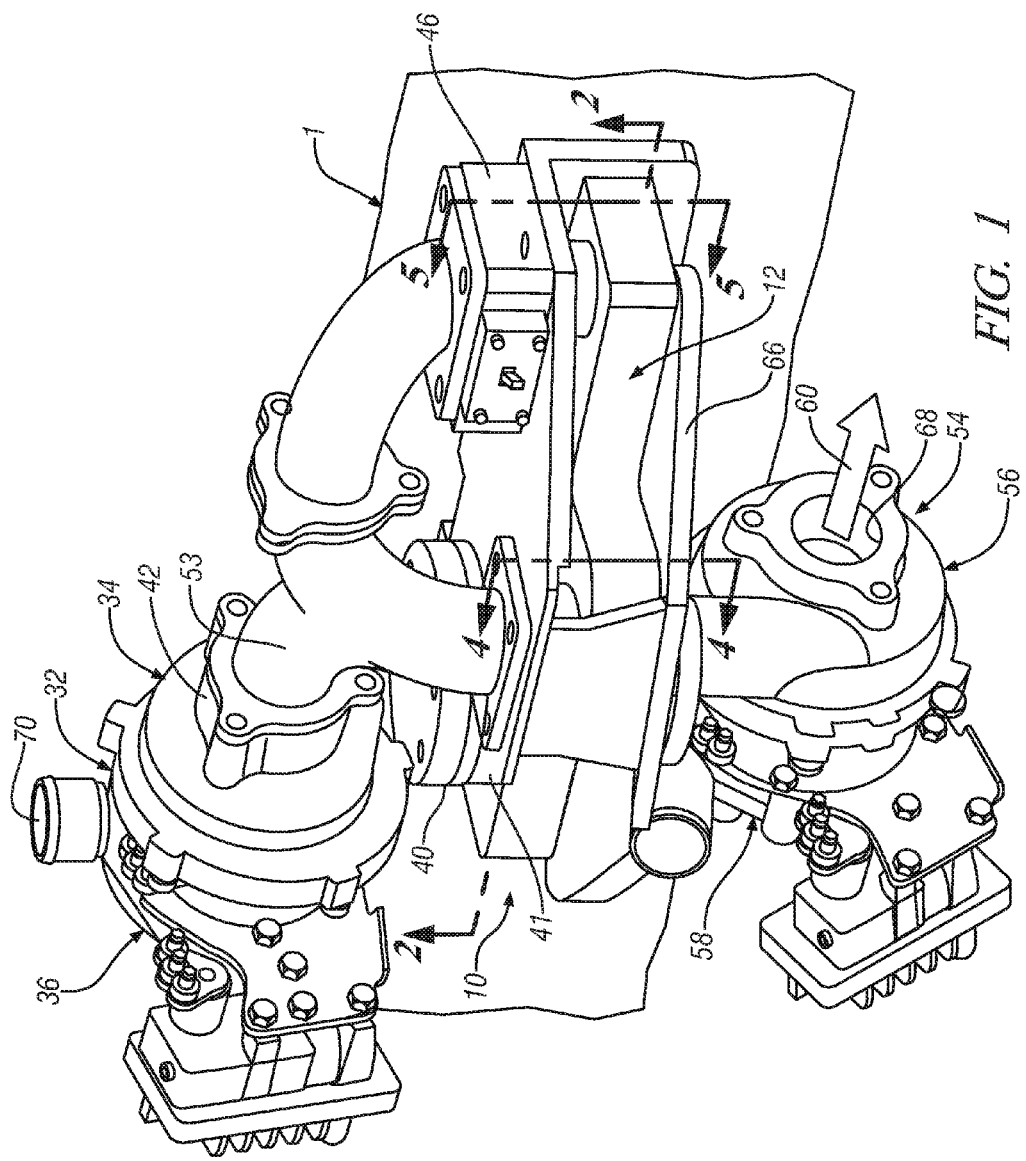
FIG. 1 is a perspective view of an exemplary embodiment of an exhaust aftertreatment system for an internal combustion engine.
Figure 2:
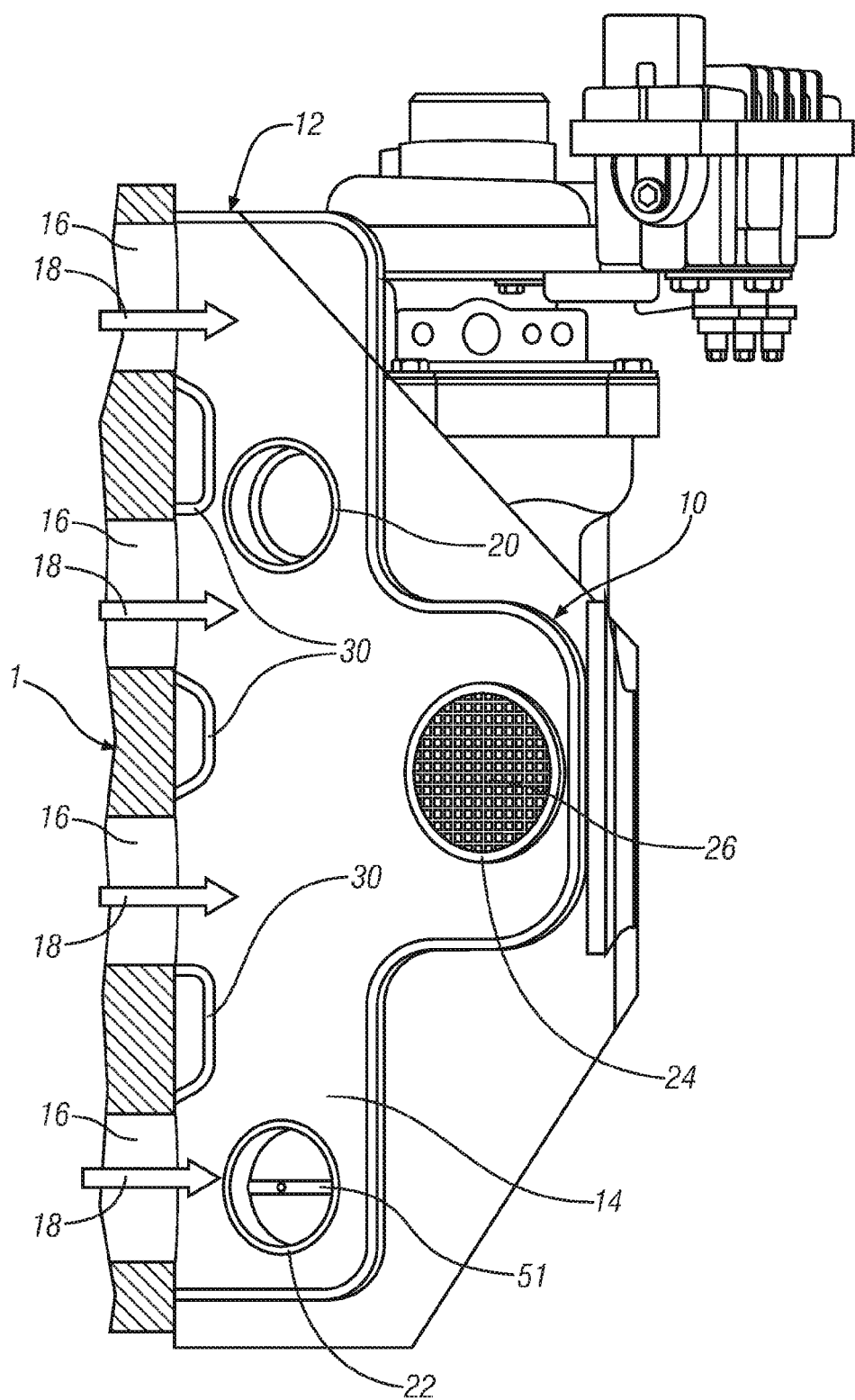
FIG. 2 is a cross-sectional perspective view of FIG. 1 taken along section 2-2.

Referring to FIGS. 1 and 2, internal combustion engine 1 includes an exhaust aftertreatment system 10. Exhaust aftertreatment system 10 includes an exhaust manifold 12 having a plenum 14 (FIG. 2) by which the manifold is in fluid communication with at least one exhaust port 16 through which exhaust gas flow 18 from a respective combustion chamber (not shown) exits engine 1 as it is operated. Internal combustion engine 1 may include all manner of single and multicylinder engine configurations, including various in-line and V-type configurations (not shown), which may also include a plurality of exhaust ports 16 and corresponding exhaust gas flows 18 in fluid communication with plenum 14, as illustrated in FIG. 2. These include all manner of engines 1 for vehicular applications, but also may include all manner of internal combustion engines used in various non-vehicular applications, including fixed location applications. Exhaust gas flows 18 are merged within plenum 14. Plenum 14 opens into primary turbine outlet 20 and bypass valve outlet 22. Exhaust manifold 12 and plenum 14 also incorporate housing 24 that houses exhaust aftertreatment device 26. Exhaust aftertreatment device 26 is illustrated herein as being disposed at least partially within exhaust manifold 12 and plenum 14 so that it is in direct thermal communication with exhaust gas flows 18. As such, housing 24 and exhaust aftertreatment device 26 that is disposed therein are exposed to and in thermal communication with these flows immediately after they have exited the respective combustion chambers and before they are subject to various thermal energy losses that occur within exhaust aftertreatment system 10 at points that are farther away from engine 1. This is a particularly advantageous location for placement of housing 24 and exhaust aftertreatment device 26 because the temperature of the exhaust gas flows 18 at this location are higher than those within any other portion of exhaust aftertreatment system 10, except those locations where exothermic reactions may occur within the system to add heat back into the system. Plenum 14 may also include one or more internal walls 30 that may be shaped to direct exhaust gas flows 18 within the exhaust manifold 12 and plenum 14.

Figure 3:
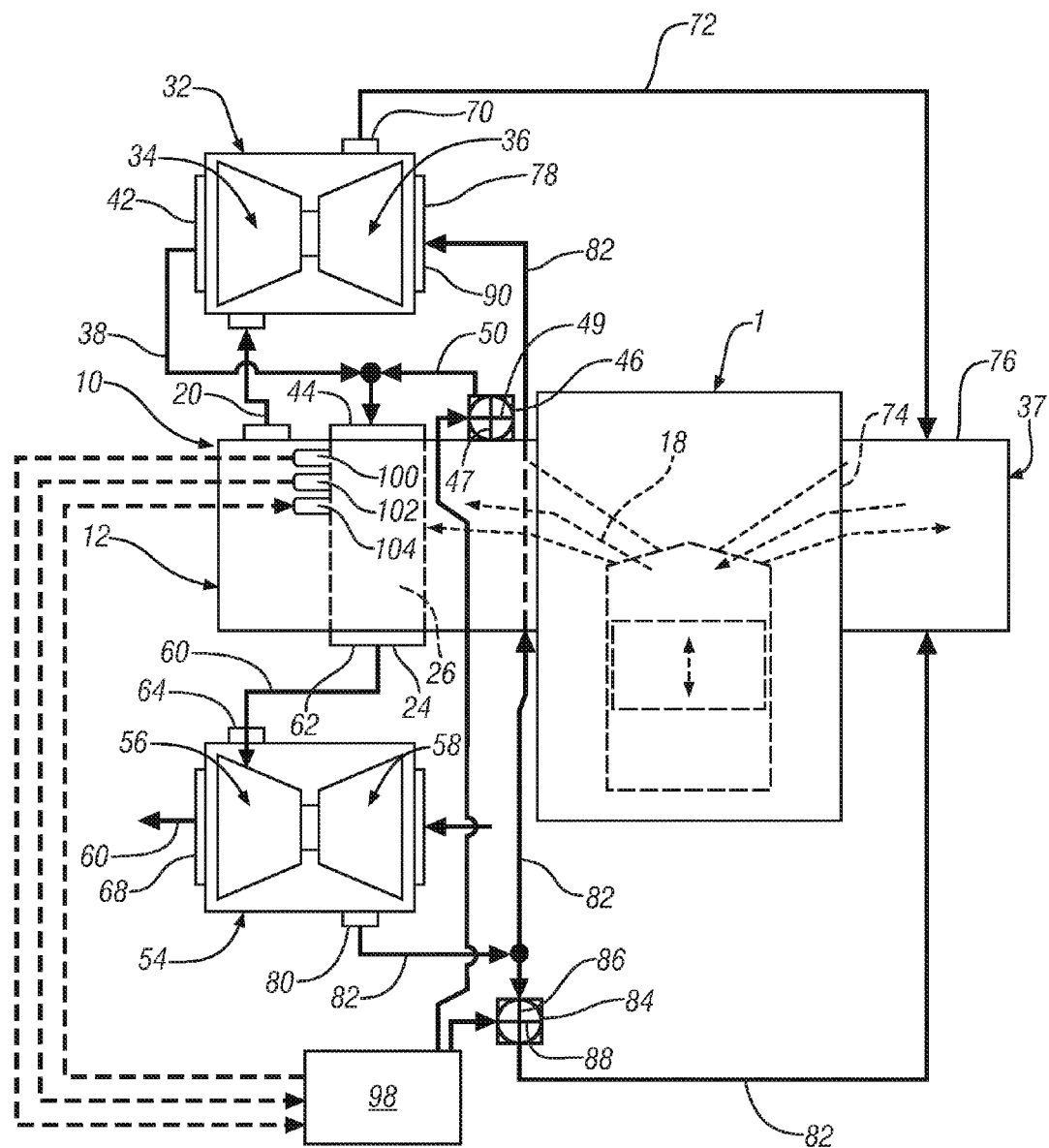
FIG. 3 is a schematic view of the exhaust aftertreatment system and internal combustion engine of FIG. 1.

As illustrated in FIG. 3, engine 1 includes at least one turbocharger 32 that may be referred to as a primary or first turbocharger 32. Primary turbocharger 32 includes a primary turbine 34 that comprises a portion of and is in fluid communication with exhaust aftertreatment system 10 and a primary compressor 36 that comprises a portion of and is in fluid communication with forced-induction intake air system 37. Primary turbine 34 is in fluid communication with, and configured to receive a primary turbine exhaust gas flow 38 from, exhaust manifold 12 through primary turbine outlet 20 thereof. This fluid communication may be accomplished by any suitable means, including the direct attachment of primary turbine exhaust inlet 40 to exhaust manifold 12 proximate primary turbine outlet 20. Fluid communication may also be promoted by use of an intermediary structure such as a conduit or mounting flange, such as upper mounting flange 41 to which primary turbine exhaust inlet 40 and primary turbine outlet 20 of exhaust manifold 12 may both be attached in order to provide such communication, as illustrated in FIGS. 1 and 2. As shown in FIG. 3, primary turbine exhaust gas flow 38 is passed through a turbine volute (not shown) and across a turbine wheel (not shown) to rotate the turbine wheel and provide the motive force through a turbine shaft (not shown) to drive a compressor wheel (not shown) of primary compressor 36 in a conventional manner. The primary turbine exhaust gas flow 38 exits primary turbine 34 through primary turbine exhaust outlet 42. Primary turbine exhaust outlet 42 is in fluid communication with exhaust aftertreatment device 26 through device inlet 44 such that the primary turbine exhaust gas flow 38 may be passed through housing 24 and exhaust aftertreatment device 26 as a portion of the exhaust aftertreatment system 10.

Figure 4:
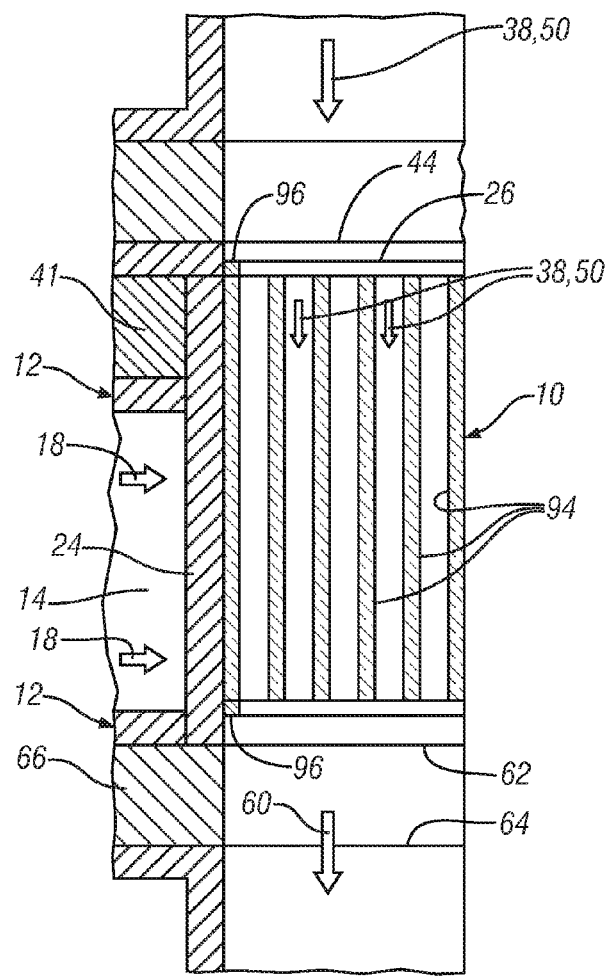
FIG. 4 is a cross-sectional perspective view of FIG. 1 taken along section 4-4.
Figure 5:
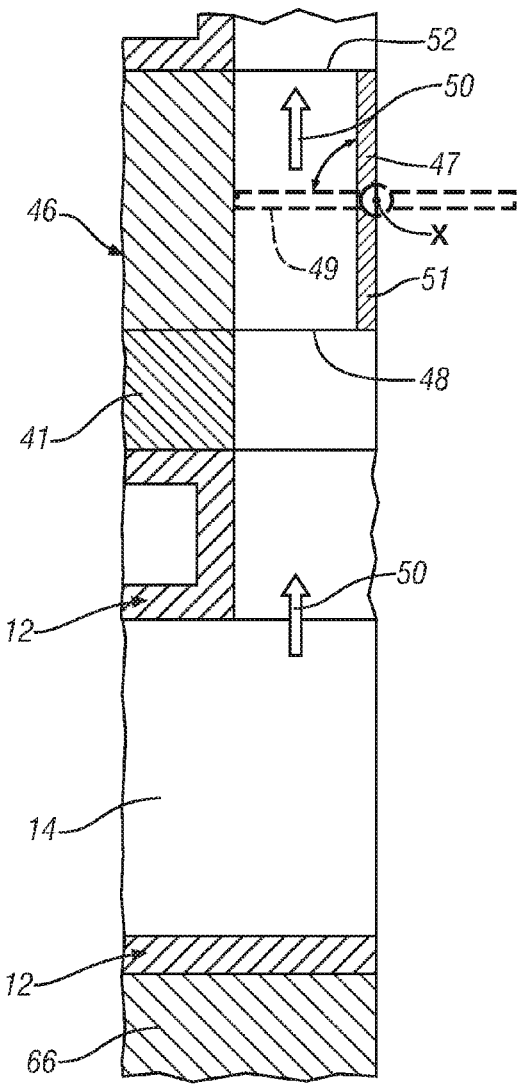
FIG. 5 is a cross-sectional perspective view of FIG. 1 taken along section 5-5.

Referring to FIGS. 1-5, the invention also includes an exhaust bypass valve 46 as a part of an exhaust aftertreatment system 10 that is operable for movement between an open position 47 and a closed position 49 about an axis X of the valve body 51 (FIG. 5). Exhaust bypass valve 46 has an exhaust bypass valve inlet 48 that is configured for fluid communication with the exhaust manifold 12 in the open position 47 to receive a bypass exhaust gas flow 50 therefrom and pass this flow to an exhaust bypass valve outlet 52. Bypass valve outlet 52 is in fluid communication with exhaust aftertreatment device 26 through device inlet 44 to receive the bypass exhaust gas flow 50 therefrom. When exhaust bypass valve 46 is in the closed position 49, there is no bypass exhaust gas flow 50 provided to exhaust aftertreatment device 26. Rather, in the closed position, primary turbine exhaust gas flow 38 is promoted and exhaust aftertreatment device 26 receives this flow through the fluid communication arrangement described above. Fluid communication of either or both of primary turbine exhaust gas flow 38 and bypass exhaust gas flow 50 to device inlet 44 can be accommodated through a suitable interconnected conduit arrangement, such as Y-pipe 53. When exhaust bypass valve 46 is in the open position, bypass exhaust gas flow 50 is promoted and primary turbine exhaust gas flow 38 is significantly reduced, or eliminated, by virtue of the fact that primary turbine 34 offers greater resistance to flow due to the features described herein that are used to extract energy from the exhaust gas flow to drive the turbine wheel. Therefore, when exhaust bypass valve 46 is in the open position, exhaust aftertreatment device 26 receives bypass exhaust gas flow 50 preferentially to primary turbine exhaust gas flow 38.

The invention may also include a secondary turbocharger having similar construction and operational characteristics to primary turbocharger 32. Secondary turbocharger 54 includes secondary turbine 56 and a secondary compressor 58. Secondary turbocharger 54 includes a secondary turbine 56 that comprises a portion of and is in fluid communication with exhaust aftertreatment system 10 and a secondary compressor 58 that comprises a portion of and is in fluid communication with forced-induction intake air system 37. Secondary turbine 56 is in fluid communication with, and configured to receive a secondary turbine exhaust gas flow 60 from housing 24 and exhaust aftertreatment device 26 through exhaust aftertreatment device outlet 62. This fluid communication may be accomplished by any suitable means, including the direct attachment of secondary turbine exhaust inlet 64. Fluid communication may also be promoted by use of an intermediary structure such as a conduit or mounting flange, such as lower mounting flange 66, to which secondary turbine exhaust inlet 64 and exhaust aftertreatment device outlet 62 may both be attached in order to provide such communication, as illustrated in FIGS. 1 and 5. As shown in FIG. 3, secondary turbine exhaust gas flow 60 is passed through a secondary turbine volute (not shown) and across a secondary turbine wheel (not shown) to rotate the secondary turbine wheel and provide the motive force through a secondary turbine shaft (not shown) to drive a secondary compressor wheel (not shown) of secondary compressor 58 in a conventional manner. The secondary turbine exhaust gas flow 60 exits secondary turbine 56 through secondary turbine exhaust outlet 68. From secondary turbine exhaust outlet 68, secondary turbine exhaust gas flow 60 can be passed to other exhaust treatment devices (not shown) that comprise exhaust aftertreatment system 10, including various combinations of oxidation catalysts, selective catalytic reduction catalysts, particulate filters and the like.

The forced-induction intake system 37 includes primary turbocharger 32 and secondary turbocharger 54. Primary turbocharger 32 includes primary compressor 36 that has a primary compressor outlet 70 configured for fluid communication of a primary forced-induction intake airflow 72 to the intake port(s) 74 of engine 1, such as by communication of a primary forced-induction intake airflow 72 to intake manifold 76. Primary compressor also includes primary compressor inlet 78 for drawing in primary intake air. The secondary turbocharger 54 includes secondary compressor 58 having a secondary compressor outlet 80 configured for fluid communication of a secondary forced-induction intake airflow 82 to the primary compressor inlet and to an intake bypass valve 84 that is operable for movement between an open position 86 and a closed position 88. The intake bypass valve 84 is configured in the open position 86 to pass the secondary forced-induction airflow 82 to the intake port(s) and in the closed position to pass the secondary forced-induction airflow to the primary compressor inlet 90. Primary turbocharger 32 and secondary turbocharger 54 in the configuration shown in FIGS. 1-5 form a sequential twin turbocharger forced-induction air intake system for engine 1.

Figure 6:
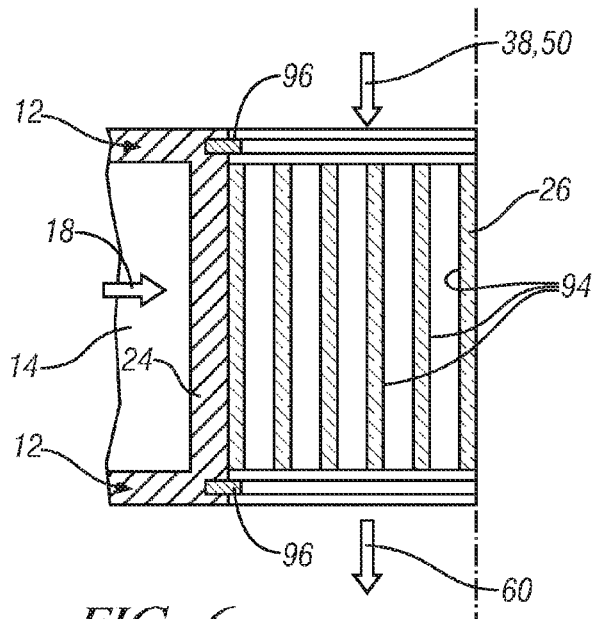
FIG. 6 is a cross-sectional view of a second exemplary embodiment of an exhaust manifold and closely-coupled exhaust treatment device for an internal combustion engine as disclosed herein.
Figure 7:
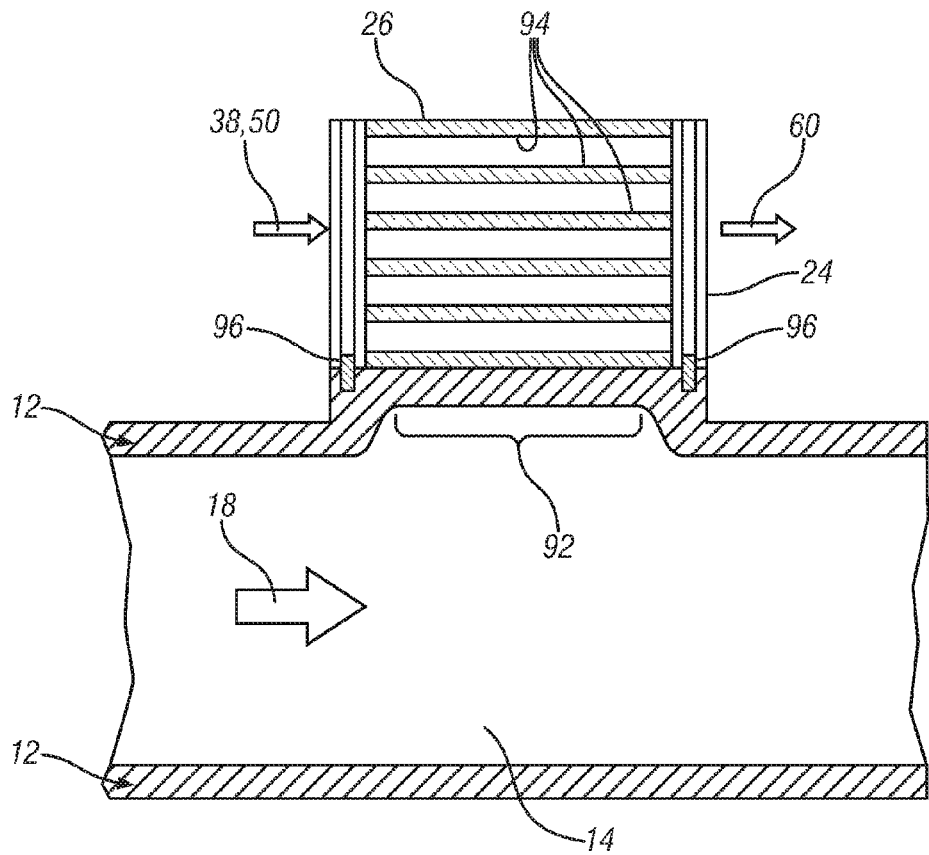
FIG. 7 is a cross-sectional view of a third exemplary embodiment of an exhaust manifold and closely-coupled exhaust treatment device for an internal combustion engine as disclosed herein.

In accordance with an exemplary embodiment of the invention, the housing 24 of exhaust aftertreatment device 26 may be disposed either partially within plenum 14 of exhaust manifold 12, as illustrated in FIGS. 1, 2 and 4. In another exemplary embodiment of the invention, housing 24 and exhaust treatment device 26 may be disposed completely within plenum 14 and manifold 12, as illustrated in FIG. 6. In this embodiment, housing 24 may be formed separately (not shown) or formed integrally with exhaust manifold 12. In this embodiment, housing 24 is also in intimate thermal communication with exhaust gas flows 18 within plenum 14 of manifold, and may be configured to be completely surrounded by these flows in the embodiments of FIGS. 4 and 6. In yet another embodiment of the invention, as illustrated in FIG. 7, housing 24 and exhaust aftertreatment device 26 may be disposed on the exhaust manifold 12 such that housing 24 is still in intimate thermal communication with exhaust gas flows 18, but unlike the embodiments of FIGS. 4 and 6, housing 24 is not surrounded, either partially (FIG. 4) or completely (FIG. 6), by exhaust gas flows 18 within plenum 14 of exhaust manifold 12. In the embodiment of FIG. 7, plenum 14 is proximate a portion of the sidewall 92 of housing 24 that is exposed to exhaust gas flows 18 to provide intimate thermal communication of the heat within the exhaust gases, but is not surrounded by the exhaust gas flows 18. In the embodiment of FIG. 7, housing 24 may be formed separately (not shown) or formed integrally with exhaust manifold 12, as shown in FIG. 7. In the embodiments of FIGS. 4, 6 and 7, housing 24 may be a metal housing and may be formed integrally with exhaust manifold 12, such as by casting. Alternately, housing 24 may be formed separately and joined to exhaust manifold 12, or otherwise placed in intimate thermal communication with exhaust manifold 12.

Exhaust aftertreatment device 26 may be any suitable type of an exhaust aftertreatment device, including various types of catalysts. In an exemplary embodiment, exhaust aftertreatment device 26 includes an oxidation catalyst (OC) of a type suitable for use with the particular type of engine 1 selected, including various types of gasoline or diesel engines. In another exemplary embodiment, where engine 1 is a diesel engine, exhaust aftertreatment device 26 includes a diesel oxidation catalyst (DOC).

In embodiments where the exhaust aftertreatment device 26 includes an OC, the OC is in fluid communication with the engine 1 and, with reference to the exhaust gas flows 38, 50, is located downstream from engine 1 and configured to oxidize certain constituents of these exhaust gas flows to produce unregulated by-products or constituents that are adapted for further treatment in other components of exhaust aftertreatment system 10, as described herein. Generally, the OC is a flow-through device that includes a metal or ceramic monolith or substrate having a honeycomb-like structure that includes a plurality of generally parallel, longitudinally-extending, interconnected cells that provide a network comprising a plurality of flow channels for receiving exhaust gas flows 38, 50 that are separated by a corresponding network of cell walls. The substrate has a large surface area along the cell walls. The cell walls have a washcoat that includes a porous ceramic matrix with a surface 94 that is coated with a catalytically active amount of a Pt group metal catalyst. Suitable platinum group metals include Pt, Pd, Rh, Ru, Os or Ir, or a combination thereof. Of these, Pt or Pd, or combinations thereof, including alloys thereof, are particularly useful. Those that include both Pt and Pd are particularly useful, such as those having Pt:Pd ratios of about 2:1 to about 4:1. As the exhaust gas flows 38, 50 traverse the length of the OC, particularly the flow channels and the washcoated cell walls, the platinum group metal catalyst catalyzes the oxidation of CO to $CO_2$, as well as catalyzing the oxidation of various HC's, including gaseous HC's and liquid HC particles, including unburned fuel or oil, or fuel or other HC reactants that are introduced into exhaust aftertreatment system 10 to form $CO_2$ and $H_2O$, thereby reducing harmful emissions and producing heat for use with other exhaust aftertreatment device, such as heat used to regenerate a particulate filter (PF). The OC, such as a DOC in the case of an exhaust aftertreatment system 10 for a diesel engine 1, may be configured to convert various regulated exhaust constituents to other regulated or unregulated exhaust constituents through oxidation. For example, the OC may be configured to oxidize HC to carbon dioxide ($CO_2$) and water ($H_2O$), convert CO to carbon dioxide ($CO_2$) convert sulfur dioxide ($SO_2$) to sulfur trioxide ($SO_3$) and/or sulfuric acid ($H_2SO_4$) and convert nitrogen oxide (NO) to nitrogen dioxide ($NO_2$), or otherwise. Where exhaust aftertreatment device 26 comprises an OC, exemplary oxidation reactions contemplated within the OC are provided below:

$$HC+O_2=CO_2+H_2O \quad (1)$$

$$CO+1/2O_2=CO_2 \quad (2)$$

$$2SO_2+O_2=2SO_3 \quad (3)$$

$$SO_3+H_2O=H_2SO_4 \quad (4)$$

$$NO+1/2O_2=NO_2 \quad (5)$$

It should be appreciated that the OC may be configured to perform any one of the above conversions, combinations of the above conversions, or even all of the above conversions, depending on the reactant compounds and their concentrations found in the exhaust gas flows 38, 50, the temperature of the OC, and the platinum group metals selected as the catalyst. Other oxidations are contemplated as well, such as oxidation of aldehydes, polycyclic aromatic hydrocarbons or otherwise. Further, the reactions in the OC may be used to reduce the odor of certain emission components.

As described herein, the OC may be housed within a separate housing 24, including a metal housing, such as a metal can having an inlet opening and outlet opening, or otherwise, configured for providing support and directing fluid flow to the OC, as shown herein. The housing 24 may comprise any suitable shape or size including a cylindrically shaped compartment. The compartment may include attachment features, such as a retainer 96 to retain the OC within the housing 24. It should be appreciated that OC, including the housing 24, may include one or more additional components for facilitating operation of OC, or exhaust aftertreatment system 10, or an engine control system 98, such as an engine control module, including, but not limited to, various gas sensors 100, temperature sensors 102, injectors 104 (e.g., fuel injectors) or otherwise. Such additional features may be particularly advantageous for monitoring characteristics of the exhaust gas flow 38, 50, such as the flow rate of certain emission constituents (e.g., particulate matter or otherwise), which may be particularly advantageous for determining the necessity of initiating certain system processes, such as, for example, the regeneration of a PF (not shown) or other catalyst (not shown) within exhaust treatment system 10.

In accordance with the invention, a first operating mode is defined when the exhaust bypass valve 46 is in the closed position 49 and the intake bypass valve 84 is in the closed position 88. These valves may be controlled by signal communication from engine control system 98. In this mode, the exhaust treatment device 26, such as an OC, is configured to receive the primary turbine exhaust gas flow 38 and the secondary forced-induction airflow 82 of secondary compressor 58 is passed through the primary compressor inlet 78. In this configuration, the pressure of the secondary forced-induction airflow 82 is increased within the primary compressor 36 and provided to the intake port(s) 74 of the engine 1. This provides a maximum boost arrangement within the forced induction intake air system 37. A second operating mode is defined when the exhaust bypass valve 46 is in the open position 47 and the intake bypass valve 84 is in the open position 86, the exhaust aftertreatment device 26, such as an OC is configured to receive the bypass exhaust gas flow 50 and the secondary forced-induction airflow 82 is passed through the intake bypass valve 84 directly to the intake port(s) 74 of the engine 1. This provides a minimum boost arrangement within the forced induction intake air system 37.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. An exhaust aftertreatment system for an internal combustion engine, comprising:
   an exhaust manifold that is configured for fluid communication with an exhaust port of an internal combustion engine to receive an exhaust gas flow therefrom;
   a primary turbocharger comprising a primary turbine having a primary turbine exhaust inlet that is configured for fluid communication with the exhaust manifold of the engine to receive a primary turbine exhaust gas flow therefrom and to pass this flow to a primary turbine exhaust outlet;
   an exhaust bypass valve that is operable for movement between an open position and a closed position, the exhaust bypass valve having an exhaust bypass valve inlet that is configured for fluid communication with the exhaust manifold in the open position to receive a bypass exhaust gas flow therefrom and pass this flow to an exhaust bypass valve outlet; and
   an exhaust aftertreatment device disposed in a housing that is attached to and configured for thermal communication with the exhaust manifold, the device having a device inlet, the device inlet configured for fluid communication with the primary turbine exhaust outlet to receive the primary turbine exhaust gas flow therefrom and for fluid communication with the exhaust bypass valve outlet to receive the bypass exhaust gas flow therefrom when the exhaust bypass valve is in the open position, and a device outlet.

2. The exhaust aftertreatment system of claim 1, further comprising:
   a secondary turbocharger comprising a secondary turbine having a secondary turbine exhaust inlet that is configured for fluid communication with the device outlet to receive a device exhaust gas flow therefrom and to pass this flow to a secondary turbine exhaust outlet.

3. The exhaust aftertreatment system of claim 2, wherein the primary turbocharger further comprises a primary compressor having a primary compressor outlet configured for fluid communication of a primary forced-induction intake airflow to the intake port of the engine and a primary compressor inlet, and the secondary turbocharger further comprises a secondary compressor having a secondary compressor outlet configured for fluid communication of a secondary forced-induction intake airflow to the primary compressor inlet and to an intake bypass valve that is operable for movement between an open position and a closed position, the intake bypass valve configured in the open position to pass the secondary forced-induction airflow to the intake port and in the closed position to pass the secondary forced-induction airflow to the primary compressor inlet.

4. The exhaust aftertreatment system of claim 1, wherein the exhaust aftertreatment device is disposed on the exhaust manifold.

5. The exhaust aftertreatment system of claim 1, wherein the exhaust aftertreatment device is disposed within the exhaust manifold.

6. The exhaust aftertreatment system of claim 1, wherein the exhaust aftertreatment device comprises an oxidation catalyst.

7. An internal combustion engine comprising an exhaust aftertreatment system, comprising:
  an internal combustion engine having an exhaust port and an intake port;
  an exhaust manifold that is configured for fluid communication with the exhaust port to receive an exhaust gas flow therefrom;
  a primary turbocharger comprising a primary turbine having a primary turbine exhaust inlet that is configured for fluid communication with the exhaust manifold of the engine to receive a primary turbine exhaust gas flow therefrom and to pass this flow to a primary turbine exhaust outlet;
  an exhaust bypass valve that is operable for movement between an open position and a closed position, the exhaust bypass valve having an exhaust bypass valve inlet that is configured for fluid communication with the exhaust manifold in the open position to receive a bypass exhaust gas flow therefrom and pass this flow to an exhaust bypass valve outlet; and
  an exhaust aftertreatment device disposed in a housing that is attached to and configured for thermal communication with the exhaust manifold, the device having a device inlet, the device inlet configured for fluid communication with the primary turbine exhaust outlet to receive the primary exhaust gas flow therefrom and for fluid communication with the exhaust bypass valve outlet to receive the bypass exhaust gas flow therefrom when the exhaust bypass valve is in the open position, and a device outlet.

8. The internal combustion engine of claim 7, further comprising:
  a secondary turbocharger comprising a turbine having a secondary turbine exhaust inlet that is configured for fluid communication with the device outlet to receive a device exhaust gas flow therefrom and to pass this flow to a secondary turbine exhaust outlet.

9. The internal combustion engine of claim 8, wherein the primary turbocharger further comprises a primary compressor having a primary compressor outlet configured for fluid communication of a primary forced-induction intake airflow to the intake port of the engine and a primary compressor inlet, and the secondary turbocharger further comprises a secondary compressor having a secondary compressor outlet configured for fluid communication of a secondary forced-induction intake airflow to the primary compressor inlet and to an intake bypass valve that is operable for movement between an open position and a closed position, the intake bypass valve configured in the open position to pass the secondary forced-induction airflow to the intake port and in the closed position to pass the secondary forced-induction airflow to the primary compressor inlet.

10. The internal combustion engine of claim 7, wherein the exhaust aftertreatment system is disposed on the exhaust manifold.

11. The internal combustion engine of claim 10, wherein the exhaust aftertreatment system is disposed in a metal housing on the exhaust manifold.

12. The internal combustion engine of claim 7 wherein the exhaust aftertreatment system is disposed within the exhaust manifold.

13. The internal combustion engine of claim 12, wherein the exhaust aftertreatment system is disposed in a metal housing disposed within the exhaust manifold.

14. The internal combustion engine of claim 7, wherein the engine is a diesel engine.

15. The internal combustion engine of claim 7, wherein the exhaust aftertreatment device comprises an oxidation catalyst (OC).

16. The internal combustion engine of claim 15, wherein the OC comprises a platinum group metal disposed on the ceramic or metal substrate.

17. The internal combustion engine of claim 16, wherein the substrate comprises a flow-through monolith.

18. The internal combustion engine of claim 7, wherein the exhaust bypass valve is disposed on the exhaust manifold.

19. The internal combustion engine of claim 7, wherein a first operating mode is defined when the exhaust bypass valve is in the closed position and the intake bypass valve is in the closed position, the OC is configured to receive the primary turbine exhaust gas flow and the secondary forced-induction airflow is passed through the primary compressor inlet, wherein a pressure of the secondary forced-induction airflow is increased within the primary compressor and provided to the intake port of the engine.

20. The internal combustion engine of claim 7, wherein a second operating mode is defined when the exhaust bypass valve is in the open position and the intake bypass valve is in the open position, the OC is configured to receive the bypass exhaust gas flow and the secondary forced-induction airflow is passed through the intake bypass valve to the intake port of the engine.

* * * * *